United States Patent
Lin (10) Patent No.: US 11,153,889 B2
(45) Date of Patent: Oct. 19, 2021

(54) USER EQUIPMENT AND UPLINK DATA TRANSMISSION METHOD THEREOF

(71) Applicant: Institute For Information Industry, Taipei (TW)

(72) Inventor: Yi-Ting Lin, Taipei (TW)

(73) Assignee: Institute For Information Industry, Taipei (TW)

(*) Notice: Subject to any disclaimer, the term of this patent is extended or adjusted under 35 U.S.C. 154(b) by 9 days.

(21) Appl. No.: 16/748,752

(22) Filed: Jan. 21, 2020

(65) Prior Publication Data

US 2020/0236688 A1    Jul. 23, 2020

Related U.S. Application Data

(60) Provisional application No. 62/795,030, filed on Jan. 22, 2019.

(51) Int. Cl.
*H04W 72/10*    (2009.01)
*H04W 72/14*    (2009.01)

(52) U.S. Cl.
CPC .......... *H04W 72/10* (2013.01); *H04W 72/14* (2013.01)

(58) Field of Classification Search
CPC . H04W 72/10; H04W 72/14; H04W 72/1294; H04W 72/1284; H04W 72/1247
See application file for complete search history.

(56) References Cited

U.S. PATENT DOCUMENTS

| 2018/0279229 | A1  | 9/2018 | Dinan et al. |
| 2018/0287748 | A1* | 10/2018 | Kim ............... H04L 49/9015 |
| 2018/0368117 | A1  | 12/2018 | Ying et al. |
| 2019/0364586 | A1* | 11/2019 | Li ..................... H04W 72/04 |
| 2020/0305186 | A1* | 9/2020 | Alfarhan ........... H04W 72/14 |

OTHER PUBLICATIONS

Office Action to the corresponding Taiwan Patent Application rendered by the Taiwan Intellectual Property Office (TIPO) dated Dec. 9, 2020, 23 pages (including English translation).

* cited by examiner

*Primary Examiner* — Dinh Nguyen
(74) *Attorney, Agent, or Firm* — Skaar Ulbrich Macari, P.A.

(57) ABSTRACT

A user equipment receives a first uplink grant and a second uplink grant from a base station. The first uplink grant assigns first uplink resources, and the second uplink grant assigns second uplink resources. The first uplink resources and the second uplink resources overlap within a time interval. The user equipment determines whether the transmission of second data has priority over that of first data. When determining that the transmission of the second data has priority over that of the first data, the user equipment determines one of the first uplink resources and the second uplink resources as the designated resources of the second data, and transmits the second data to the base station according to the designated resources within the time interval.

20 Claims, 5 Drawing Sheets

USER EQUIPMENT AND UPLINK DATA TRANSMISSION METHOD THEREOF

PRIORITY

This application claims the priority and benefit of U.S. Provisional Patent Application Ser. No. 62/795,030 filed on Jan. 22, 2019 and titled "Intra-UE Prioritization and Multiplexing for Different Services," the entirety of which is incorporated herein by reference.

FIELD

Embodiments of the present invention relate to a user equipment and a transmission method thereof. More specifically, embodiments of the present invention relate to a user equipment and an uplink data transmission method thereof.

BACKGROUND

Under several traditional communication architectures, a user equipment must perform uplink data transmission according to the uplink resources allocated by a base station. Under such communication architectures, if the user equipment has multiple communication modes (multi-service modes), it must determine its communication mode according to the uplink resources allocated by the base station, and then perform the corresponding uplink data transmission. When the base station allocates two kinds of uplink resources that overlap in time for two communication modes of the user equipment through two uplink grants respectively, the user equipment can only determine a corresponding communication mode according to the priorities of the uplink grants. Therefore, if the user equipment prefers to adopt a certain communication mode, it cannot do it unless the uplink grant which assigns the uplink resources allocated by the base station for the desired communication mode has priority over the other uplink grant. For example, under the 5G mobile communication architecture where a base station allocates uplink resources for the Ultra-Reliable and Low Latency Communications (URLLC) mode and the enhanced Mobile Broadband (eMBB) mode through a configured grant and a dynamic grant respectively, the user equipment can only perform uplink transmission for the eMBB data based on the dynamic grant because the dynamic grant has priority over the configured grant, even though the URLLC data has priority over the eMBB data. There is adverse impact to the reliability and efficiency of URLLC mode in such a case.

In view of this, there is an urgent problem as for how to provide a mechanism to enable the user equipment to adopt the most suitable communication mode for the uplink data transmission with a base station.

SUMMARY

Provided is a user equipment. The user equipment may comprise a storage, a transceiver, and a processor which are electrically connected to each other. The storage may be configured to store first data and second data. The transceiver may be configured to receive a first uplink grant and a second uplink grant from a base station, wherein the first uplink grant assigns first uplink resources allocated by the base station to the user equipment, the second uplink grant assigns second uplink resources allocated by the base station to the user equipment, and the first uplink resources and the second uplink resources overlap within a time interval. The processor may be configured to determine whether transmission of the second data has priority over transmission of the first data. When the processor determines that the transmission of the second data has priority over the transmission of the first data, the processor determines one of the first uplink resources and the second uplink resources as designated resources of the second data, and the transceiver transmits the second data to the base station according to the designated resources within the time interval.

Further provided is an uplink data transmission method. The method may comprise: receiving, by a user equipment, a first uplink grant and a second uplink grant from a base station, wherein the first uplink grant assigns first uplink resources allocated by the base station to the user equipment, the second uplink grant assigns second uplink resources allocated by the base station to the user equipment, and the first uplink resources and the second uplink resources overlap within a time interval; determining, by the user equipment, whether transmission of second data has priority over transmission of first data, wherein the first data and the second data are stored in the user equipment; and determining one of the first uplink resources and the second uplink resources as designated resources of the second data and transmitting the second data to the base station according to the designated resources within the time interval, by the user equipment, when the user equipment determines that the transmission of the second data has priority over the transmission of the first data.

If the base station allocates a plurality of uplink resources to the user equipment through a plurality of uplink grants respectively, the user equipment can determine the transmission order of various uplink data according to the transmission priorities of the uplink data (that is, the priorities of the communication modes) so that the uplink data with high transmission order can be transmitted preferentially. In addition, whenever the uplink data to be transmitted is determined, the user equipment can select and determine the designated resources which is suitable for the uplink data from the available uplink resources, thereby increasing the applicability and the flexibility of the transmission of the uplink data. With such mechanism, a user equipment is able to adopt the most suitable communication mode for the uplink data transmission with a base station.

What have described above is not intended to limit the present invention, but merely outlines the solvable technical problems, the usable technical means, and the achievable technical effects for a person having ordinary skill in the art (PHOSITA) to preliminarily understand the present invention. According to the attached drawings and the following detailed description, the PHOSITA can further understand the details of various embodiments of the present invention.

BRIEF DESCRIPTION OF THE DRAWINGS

The drawings are provided for describing various embodiments, in which.

DETAILED DESCRIPTION

In the following description, the present invention will be explained with reference to certain example embodiments thereof. However, these example embodiments are not intended to limit the present invention to any specific environment, applications, embodiments, examples, or particular implementations described in these example embodiments. In the attached drawings, elements unrelated to the present invention are omitted from depiction but may be implied in the drawings; and dimensions of elements and proportional relationships among individual elements in the attached drawings are only exemplary examples but not intended to limit the present invention. Unless stated particularly, same (or similar) element symbols may correspond to same (or similar) elements in the following description. Unless stated particularly, the number of each element described hereinafter may be one or more while being implementable.

Terms used in the present disclosure are only for the purpose of describing embodiments and are not intended to limit the invention. Singular forms "a," "an," and "the" are intended to include the plural forms as well, unless the context clearly indicates otherwise. Terms such as "comprises" and/or "comprising" specify the presence of stated features, integers, steps, operations, elements, and/or components, but do not preclude the presence of one or more other features, integers, steps, operations, elements, components, and/or combinations thereof. The term "and/or" includes any and all combinations of one or more associated listed items.

Figure 1:
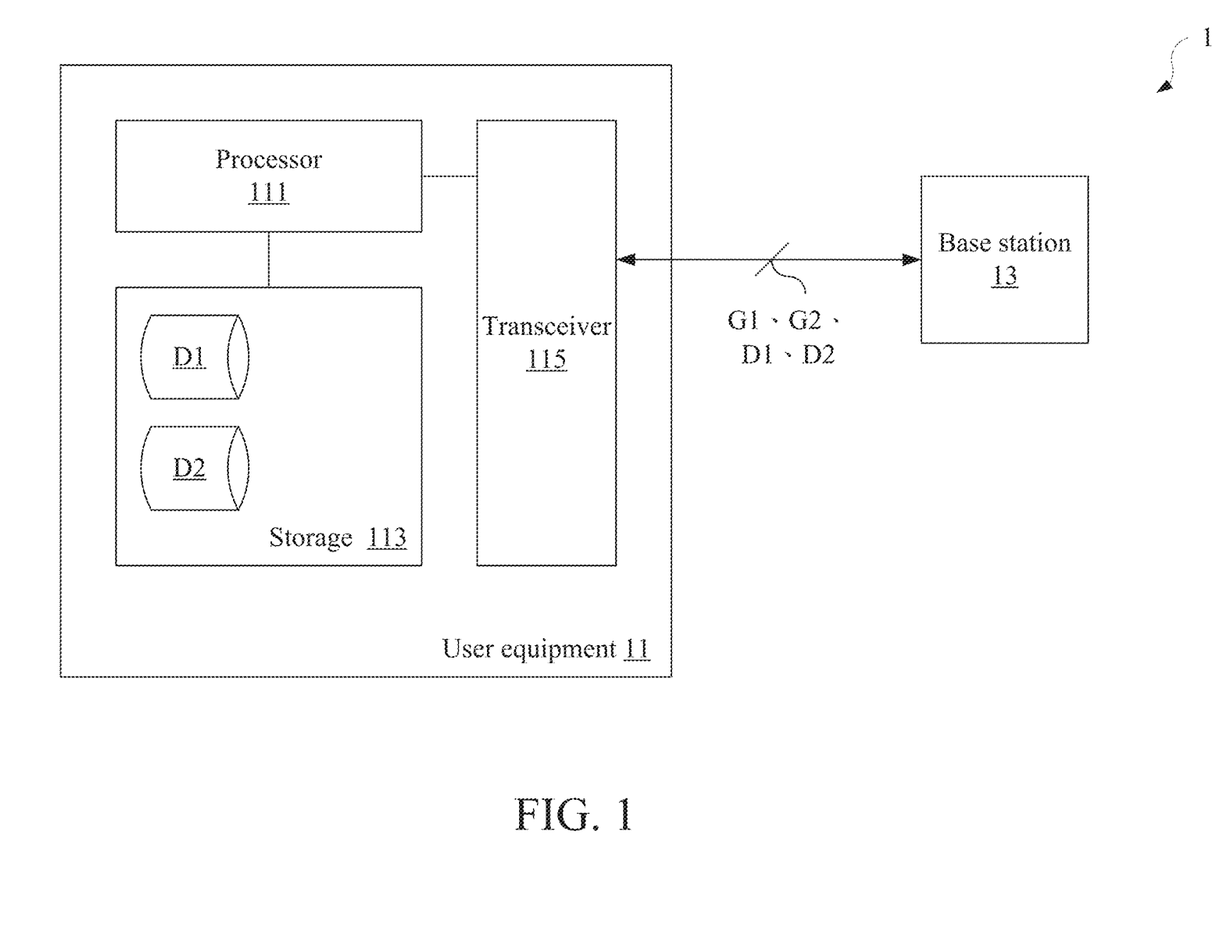
FIG. 1 illustrates a wireless communication system according to some embodiments.

FIG. 1 illustrates a wireless communication system according to some embodiments. The content of FIG. 1 is shown only for the purpose of illustrating embodiments of the present invention and is not intended to limit the present invention.

Referring to FIG. 1, the wireless communication system 1 may basically comprise a user equipment 11, a base station 13, and a core network (not shown). The user equipment 11 may basically comprise a processor 111, a storage 113, and a transceiver 115 which are electrically connected (directly connected or indirectly connected) to each other. According to different requirements, the user equipment 11 may be various electronic devices such as a mobile phone, a tablet computer, a notebook computer, and various Internet of Things (IoT) products.

The processor 111 may be a variety of microprocessors or microcontrollers with signal processing functions. A microprocessor or microcontroller is a programmable special integrated circuit that has the functions of calculation, storage, output/input, etc., and can receive and process various coding instructions, thereby performing various logic calculations and arithmetic operations, and outputting the corresponding calculated result. The processor 111 can be programmed to interpret various instructions and perform various tasks or programs. For example, as described later, the processor 111 may compare the priorities of the first data D1 and the second data D2 to determine which data should be transmitted first, and after determining the designated resources which is suitable for the data to be transmitted, instruct the transceiver 115 to transmit the data to the base station 13 according to the designated resources.

The storage 113 may comprise various storage units provided in a general computing device/computer. The storage 113 may comprise a primary storage device (also referred to as main memory or internal memory), which is usually simply referred to as a memory, and is directly connected to the processor 111. The processor 111 may read the instruction sets stored in the memory and execute the instruction sets when needed. The storage 113 may also comprise a secondary storage device (also known as external memory or auxiliary memory), which is connected to the processor 111 through I/O channels of the memory, and uses a data buffer to transfer data to the primary storage device. The secondary storage device may include, for example, various types of hard disk drive, and optical disk hard disk drive. The storage 113 may also comprise a third-level storage device, such as a flash drive that can be directly inserted into or removed from a computer, or a cloud drive. For example, as described later, the storage 113 may be configured to store the first data D1 and the second data D2.

The transceiver 115 may be constituted of a transmitter and a receiver, and may comprise, for example but not limited to: an antenna, an amplifier, a modulator, a demodulator, a detector, and a communication component such as an analog-to-digital converters and a digital-to-analog converter. Through the transceiver 115, the user equipment 11 can communicate with external devices and exchange data. For example, as described later, the user equipment 11 may communicate with the base station 13 through the transceiver 115 to receive first uplink grant G1 and second uplink grant G2 provided by the base station 13, and transmit the first data D1 and/or the second data D2 to the base station 13.

According to different requirements, the base station 13 may be different types of base stations, for example but not limited to: Macrocells, Microcells, or Picocells. The base station 13 may determine and provide the uplink grants (for example, the first uplink grant G1 and the second uplink grant G2) to assign the uplink resources for the user equipment 11 to perform uplink data transmission.

In summary, in FIG. 1, the processor 111 of the user equipment 11 determines whether the transmission of the second data D2 has priority over the transmission of the first data D1, and when determining that the transmission of the second data D2 has priority over the transmission of the first data D1, the processor 111 determines one of the first uplink resources assigned by the first uplink grant G1 and the second uplink resources assigned by the second uplink grant G2 as the designated resources of the second data D2. Then, the transceiver 115 of the user equipment 11 will transmit the second data D2 to the base station 13 according to the designated resources within the time interval in which the first uplink resources and the second uplink resources overlap. In some embodiments, the processor 111 may determine whether the transmission of the second data D2 has priority over the transmission of the first data D1 according to logical channel prioritization. In addition, in some embodiments, the processor 111 may determine one of the first uplink resources and the second uplink resources as designated resources of the second data D2 according to the attributes of the first uplink grant G1 and the attributes of the second uplink grant G2.

Figure 2A:
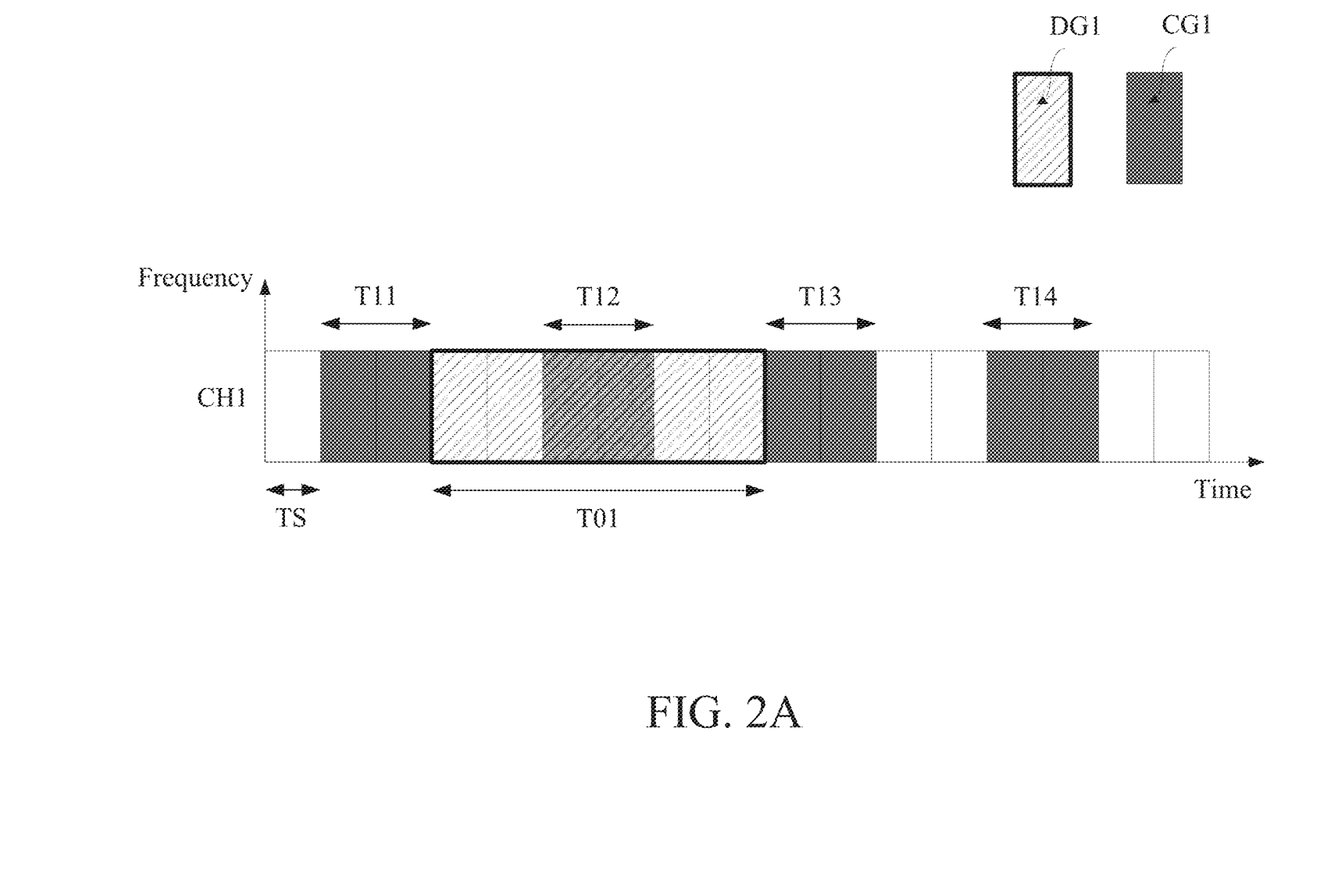
FIG. 2A illustrates a resource configuration comprising one dynamic grant and one configured grant according to some embodiments.
Figure 2B:
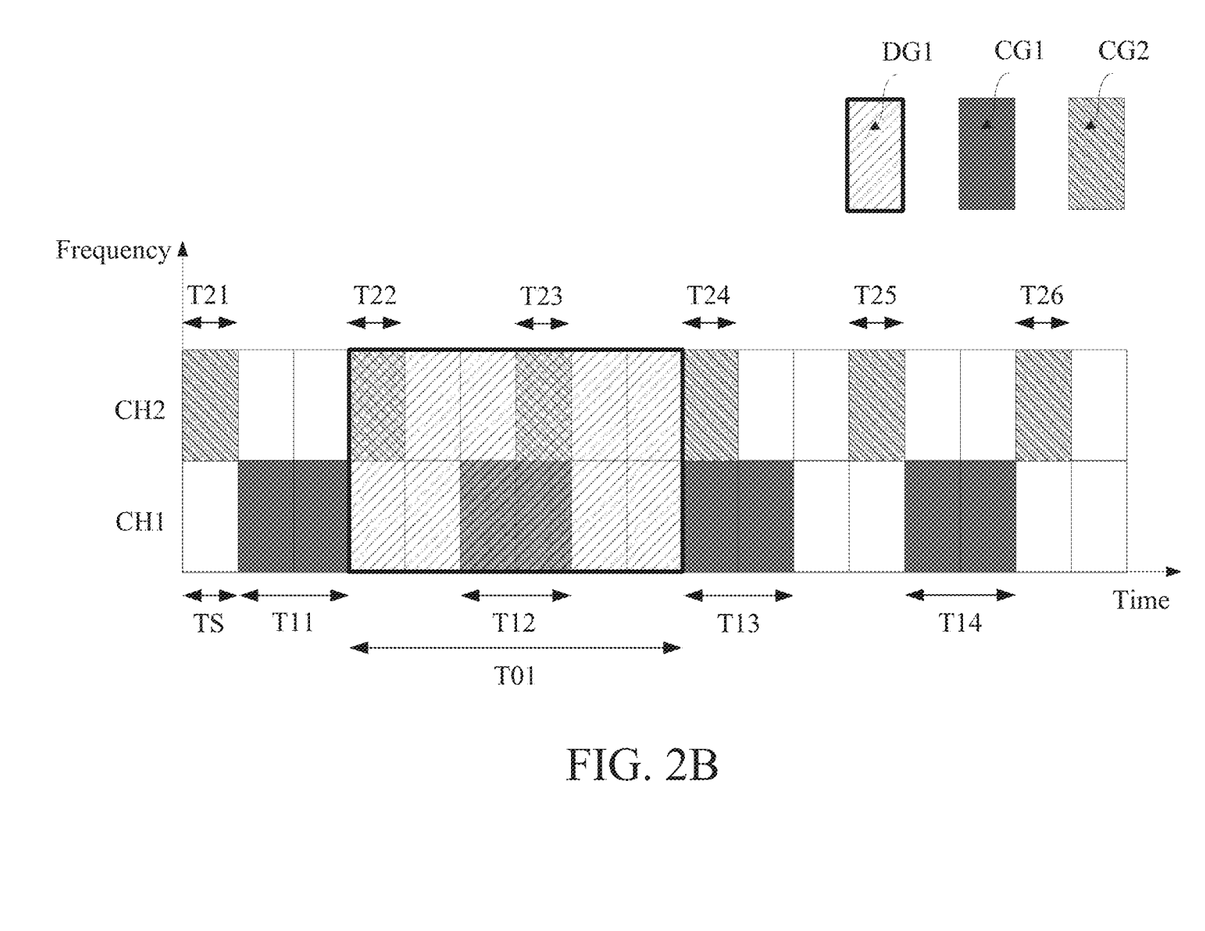
FIG. 2B illustrates a resource configuration comprising one dynamic grant and multiple configured grants according to some embodiments.

FIG. 2A illustrates a resource configuration comprising one dynamic grant and one configured grant according to some embodiments, and FIG. 2B illustrates a resource configuration comprising one dynamic grant and multiple configured grants according to some embodiments. The contents of FIG. 2A and FIG. 2B are shown only for the purpose of illustrating embodiments of the present invention and are not intended to limit the present invention. In FIG. 2A and FIG. 2B, each block refers to a time slot TS, and each uplink grant assigns the uplink resources in units of time slots TS.

As shown in FIG. 2A, the base station 13 provides a dynamic grant DG1 and a configured grant CG1 to the user equipment 11. The dynamic grant DG1 is configured to dynamically assign uplink resources allocated by the base station 13 to the user equipment 11, which permits the user equipment 11 to transmit uplink data to the base station 13 within the time interval T01 (which has six time slots TS) through the channel CH1. The configured grant CG1 is configured to periodically assign uplink resources allocated by the base stations 13 to the user equipment 11, which permits the user equipment 11 to transmit uplink data to the base station 13 within the time intervals T11, T12, T13 and T14 (each has two time slots TS) through channel CH1. The channel CH1 may be a physical channel on which uplink data can be transmitted such as a Physical Uplink Shared Channel (PUSCH).

In FIG. 2A, the uplink resources assigned by the dynamic grant DG1 and the uplink resources assigned by the configured grant CG1 overlap within the time interval T12. Therefore, after the user equipment 11 determines the uplink data to be transmitted, the user equipment 11 will determine one of the first uplink resources assigned by the dynamic grant DG1 within the time interval T01 and the second uplink resources assigned by the configured grant CG1 within the time interval T12 as the designated resources (for example, the first uplink resources or the second uplink resources) suitable for the determined uplink data, and then perform transmission of the uplink data with the base station 13 according to this designated resources.

In some embodiments, the base station 13 may provide a plurality of different configured grants to the user equipment 11. For example, as shown in FIG. 2B, the base station 13 further provides another configured grant CG2 to the user equipment 11 in addition to the configured grant CG1. The configured grant CG2 also periodically assigns uplink resources allocated by the base station 13 to the user equipment 11, but as compared with the configured grant CG1, the configured grant CG2 permits the user equipment 11 to transmit uplink data to the base station 13 through channel CH2 within the time intervals T21, T22, T23, T24, T25, and T26 (each has only one time slot TS). In addition, in FIG. 2B, the dynamic grant DG1 permits the user equipment 11 to transmit uplink data to the base station 13 through the channel CH1 and the channel CH2 within the time interval T01 (which has six time slots TS). The channel CH2 may also be a physical channel on which uplink data can be transmitted such as a physical uplink shared channel.

In FIG. 2B, the uplink resources assigned by the dynamic grant DG1 not only overlaps with the uplink resources assigned by configured grant CG1 within the time interval T12, but also overlaps with the uplink resources assigned by the configured grant CG2 within the time intervals T22 and T23. Therefore, after the user equipment 11 determines the uplink data to be transmitted, the user equipment 11 will determine one of the first uplink resources assigned by the dynamic grant DG1 within the time interval T01, the second uplink resources assigned by the configured grant CG1 within the time interval T12, and the third uplink resources assigned by the configured grant CG2 within the time interval T22 as the designated resources (for example, the first uplink resources, the second uplink resources, the third uplink resources, or both second uplink resources and third uplink resources) suitable for the determined uplink data, and then perform transmission of the uplink data with the base station 13 according to the designated resources.

As the number of configured grants provided to the user equipment 11 by the base station 13 increases, the probability that the uplink resources assigned by the dynamic grant DG1 and the uplink resources assigned by these configured grants overlap in time will increase. For example, as compared to the content of FIG. 2A, since the base station 13 of FIG. 2B additionally provides the configured grant CG2 to the user equipment 11, more likely the uplink resources assigned by the dynamic grant DG1 overlaps with the uplink resources assigned by the configured grants (either the configured grant CG1 or the configured grant CG2) in time. In such a case, it become more important regarding how the user equipment 11 performs uplink data transmission with the base station 13, including how to determine the transmission order of uplink data and how to determine the designated resources for the uplink data to be transmitted.

Figure 3:
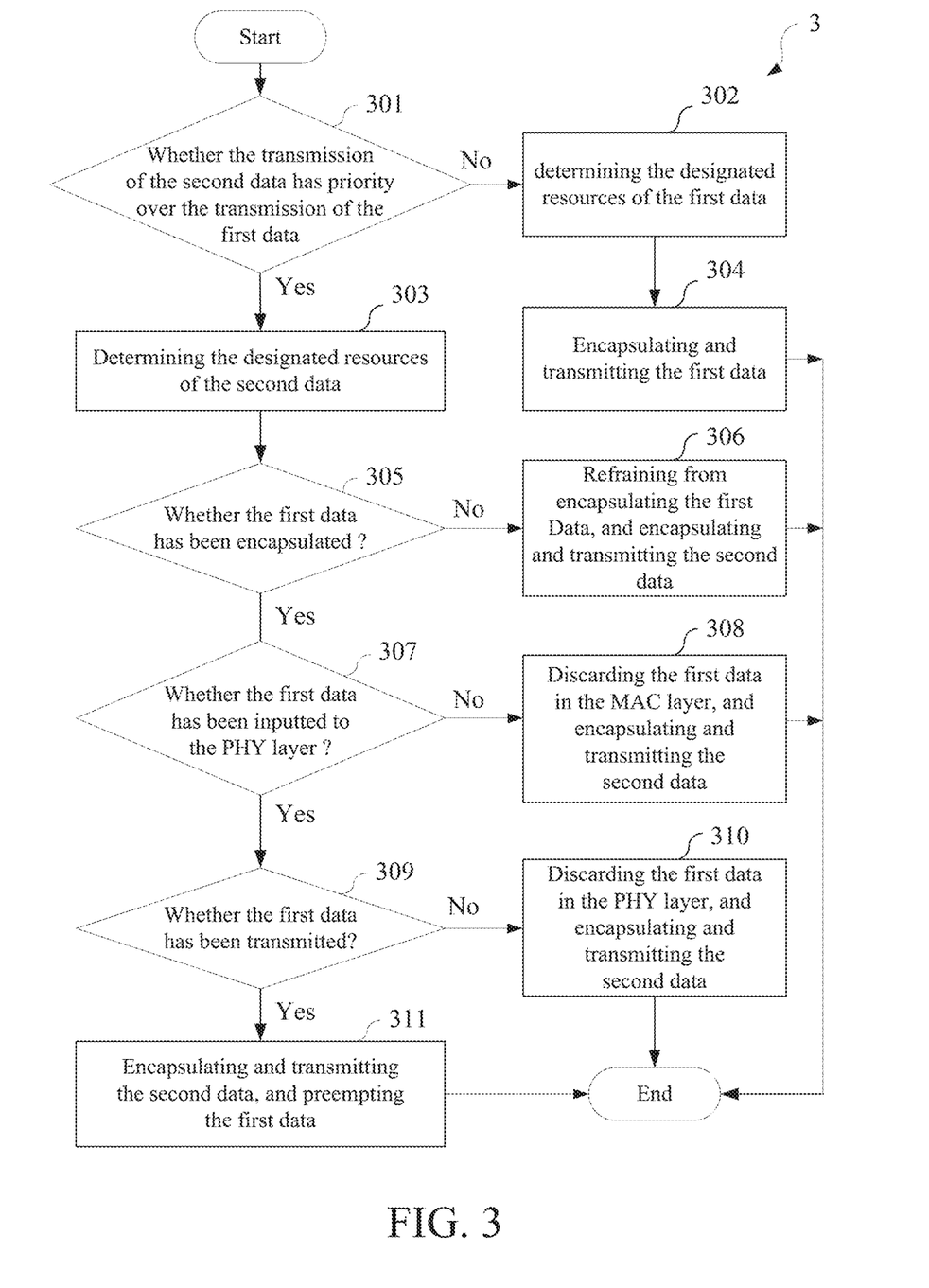
FIG. 3 illustrates a flow of uplink data transmission performed by the user equipment of FIG. 1 according to some embodiments.

FIG. 3 illustrates a flow 3 of uplink data transmission performed by the user equipment 11 of FIG. 1 according to some embodiments. The content of FIG. 3 is shown only for the purpose of illustrating embodiments of the present invention and is not intended to limit the present invention. The following description in connection with FIG. 3, unless explained otherwise, will go with a hypothetical condition where the first uplink grant G1 is a dynamic grant, the second uplink grant G2 is a configured grant, the first data D1 is eMBB data, and the second data D2 is URLLC data.

Referring to FIG. 3, in the process 301, the processor 111 determines whether the transmission of the second data D2 has priority over the transmission of the first data D1. If the user equipment 11 determines that the transmission of the first data D1 has priority over the transmission of the second data D2, the process 302 will be executed; otherwise, the process 303 will be executed.

In some embodiments, the processor 111 may determine whether the transmission of the second data D2 has priority over the transmission of the first data D1 according to the logical channel prioritizations of the logical channels corresponding to the first data D1 and the second data D2 respectively. For example, in a case where the first data D1 and the second data D2 respectively correspond to the first logical channel and the second logical channel, if the processor 111 determines that the logical channel prioritization of the second logical channel is higher than that of the first logical channel, it may determine that the transmission of the second data D2 has priority over the transmission of the first data D1; otherwise, it may determine that the transmission of the first data D1 has priority over the transmission of the second data D2. In a case where the logical channel prioritization of the second logical channel is equal to that of the first logical channel, the processor 111 can determine that the transmission of the second data D2 has priority over the transmission of the first data D1 or the transmission of the first data D1 has priority over the transmission of the second data D2 according to a predetermined rule.

In some embodiments, the processor 111 may also determine the transmission order of uplink data according to their corresponding communication modes. For example, in a case that the URLLC mode has priority over the eMBB mode, if the communication mode of the second data D2 is the URLLC mode (i.e., URLLC data) and that of the first data D1 is the eMBB mode (i.e., eMBB data), the processor 111 determines that the transmission of the second data D2 has priority over the transmission of the first data D1.

In some embodiments, in the process 301, the processor 111 determines whether the transmission of the second data D2 has priority over the transmission of the first data D1 in a Media Access Control (MAC) layer.

In process 302, the processor 111 determines one of the first uplink resources assigned by the first uplink grant G1 and the second uplink resources assigned by the second uplink grant G2 as the designated resources of the first data D1. Then, in the process 304, the processor 111 encapsulates the first data D1 into a first Media Access Control Protocol Data Unit (MAC PDU) according to the designated resources, and the transceiver 115 transmits the first MAC PDU to the base station 13 according to the designated resources.

Similarly, in process 303, the processor 111 determines one of the first uplink resources assigned by the first uplink grant G1 and the second uplink resources assigned by the second uplink grant G2 as the designated resources of the second data D2. Then, as described later, the processor 111 encapsulates the second data D2 into a second MAC PDU according to the designated resources, and the transceiver 115 transmits the second MAC PDU to the base station 13 according to the designated resources.

In the process 302 or the process 303, the processor 111 determines one of the first uplink resources assigned by the first uplink grant G1 and the second uplink resources assigned by the second uplink grant G2 as the designated resources and the transmitter 115 transmits the first data D1 or the second data D2 based on the designated resources. Under the circumstances, because the base station 13 does not know that user equipment 11 used which one of the first uplink resources and the second uplink resources as the designated resources to transmit the first data D1 or the second data D2, it has to blindly decode the received first data D1 or the second data D2 based on these two uplink resources respectively. However, in some embodiments, before transmitting the first data D1 or the second data D2 to the base station 13, the transceiver 115 may transmit a notification of the respective designated resources to the base station 13 so that the base station 13 can directly decode the received first data D1 or the second data D2 based on the correct uplink resources.

In some embodiments, the processor 111 may determine one of the first uplink resources assigned by the first uplink grant G1 and the second uplink resources assigned by the second uplink grant G2 as the designated resources of the first data D1 or the second data D2 according to the attributes of the first uplink grant G1 and the attributes of the second uplink grant G2. For example, in a case where the first uplink grant G1 is a dynamic grant, the second uplink grant G2 is a configured grant, the first data D1 is eMBB data, and the second data D2 is URLLC data, because the attributes of the dynamic grant and the configured grant are suitable for eMBB data and URLLC data respectively, the processor 111 may default to selecting the uplink resources assigned by the first uplink grant G1 (that is, the dynamic grant) as the designated resources of the first data D1, and default to selecting the uplink resources assigned by the second uplink grant G2 (that is, the configured grant) as the designated resources of the second data D2. It should be noted that, in general, most of URLLC data is periodic data, so it is more suitable to arrange a fixed and periodic grant for the transmission of such data. For example, the fixed and periodic grant may be a configured grant or a Semi-Persistent scheduling (SPS) grant. On the other hand, burst transmission characterize most of eMBB data, so it is more suitable to arrange a dynamic grant for the transmission of such data.

In some embodiments, in the process 302 or the process 303, the processor 111 determines one of the first uplink resources assigned by the first uplink grant G1 and the second uplink resources assigned by the second uplink grant G2 as the designated resources of the first data D1 or the second data D2 according to the attributes of the first uplink grant G1 and the attributes of the second uplink grant G2 in a physical (PHY) layer.

In some embodiments, in the case where the processor 111 defaults to selecting the second uplink resources assigned by the second uplink grant G2 as the designated resources of the second data D2, the processor 111 may also determine whether a prioritization indication of the second uplink grant G2 is lower than a logical channel prioritization indication of the second data D2. In addition, only when determining that the prioritization indication of the second uplink grant G2 is lower than the logical channel prioritization indication of the second data D2, the processor 111 determines to select the second uplink resources assigned by the second uplink grant G2 as the designated resources of the second data D2. For example, assuming the prioritization indication of the second uplink grant G2 is "4", the processor 111 determines to select the second uplink resources assigned by the second uplink grant G2 as the designated resources of the second data D2 only when the logical channel prioritization indication of the second data D2 is "1," "2," or "3." Similarly, the processor 111 may determine the designated resources of the first data D1 accordingly.

In some embodiments, in the case where the processor 111 defaults to selecting the second uplink resources assigned by the second uplink grant G2 as the designated resources of the second data D2, the processor 111 may also determine whether the second uplink grant G2 permits the transmission of the second data D2. In addition, only when determining that the second uplink grant G2 permits the transmission of the second data D2, the processor 111 determines to select the second uplink resources assigned by the second uplink grant G2 as the designated resources of the second data D2. For example, assuming that the second uplink grant G2 corresponds to a predetermined white list, the processor 111 determines to select the second uplink resources assigned by the second uplink grant G2 as the designated resources of the second data D2 only when the logical channel of the second data D2 is recorded on the predetermined white list. It should be noted that, in some cases, when none of the logical channels listed on the predetermined white list need to be used to transmit data, the processor 111 may use the logical channels which are not listed on the predetermined white list to transmit the second data D2 according to the second uplink resources, in order to avoid wasting the uplink resources. Similarly, the processor 111 may determine the designated resources of the first data D1 accordingly.

In some embodiments, when the process 303 ends, the state of the first data D1 may be different. Therefore, as shown in FIG. 3, the processes 305, 307, and 309 may be executed to determine the current state of the first data D1. Then, according to the current state of the first data D1, different processes 306, 308, 310, and 311 will be executed.

In the process 305, the processor 111 may determine whether the first data D1 has been encapsulated into a first MAC PDU. If the determination of the process 305 is negative, the process 306 will be executed; otherwise, the process 307 will be executed.

In the process 306, the processor 111 refrains from encapsulating the first data D1, and encapsulates the second data D2 into a second MAC PDU in the MAC layer based on the designated resources of the second data D2 determined in the process 303, and then transmits the second MAC PDU and a transmission notification to the PHY layer. Here, the transmission notification is configured to instruct the PHY layer to transmit the second MAC PDU to the base station 13 according to the designated resources of the second data D2.

In the process 307, the processor 111 may further determine whether the first data D1 which has been encapsulated into the first MAC PDU has also been inputted to the PHY layer. If the determination of the process 307 is negative, the process 308 will be executed; otherwise, the process 309 will be executed.

In the process 308, the processor 111 discards, in the MAC layer, the first data D1 that has been encapsulated into the first MAC PDU. In addition, the processor 111 encapsulates the second data D2 into a second MAC PDU in the MAC layer according to the designated resources of the second data D2 determined in the process 303, and then input the second MAC PDU and a transmission notification to the PHY layer. Here, the transmission notification is configured to instruct the PHY layer to transmit the second MAC PDU to the base station 13 according to the designated resources.

In the process 309, the processor 111 may further determine whether the PHY layer is transmitting the first MAC PDU (i.e., the first data D1). If the determination of the process 309 is negative, the process 310 will be executed; otherwise, the process 311 will be executed.

In the process 310, the processor 111 encapsulates the second data D2 into a second MAC PDU in the MAC layer according to the designated resources of the second data D2 determined in process 303, and then transmits the second MAC PDU and a transmission notification to the PHY layer. Here, the transmission notification is configured to instruct the PHY layer to discard the first MAC PDU (i.e., the first data D1), and instruct the PHY layer to transmit the second MAC PDU to the base station 13 according to the designated resources of the second data D2.

In the process 311, the processor 111 encapsulates the second data D2 into a second MAC PDU in the MAC layer according to the designated resources of the second data D2 determined in process 303, and then transmits the second MAC PDU and a transmission notification to the PHY layer. Here, the transmission notification is configured to instruct the PHY layer to transmit the second MAC PDU to the base station 13 according to the designated resources of the second data D2, and to preempt the first data D1. In some embodiments, according to the transmission notification, the PHY layer may stop transmitting the first MAC PDU when it starts transmitting the second MAC PDU. In some embodiments, according to the transmission notification, the PHY layer may continue to transmit the first MAC PDU after starting the transmission of the second MAC PDU, but also enable that the base station 13 gives priority to the second MAC PDU than the detects first MAC PDU while decoding them.

Figure 4:
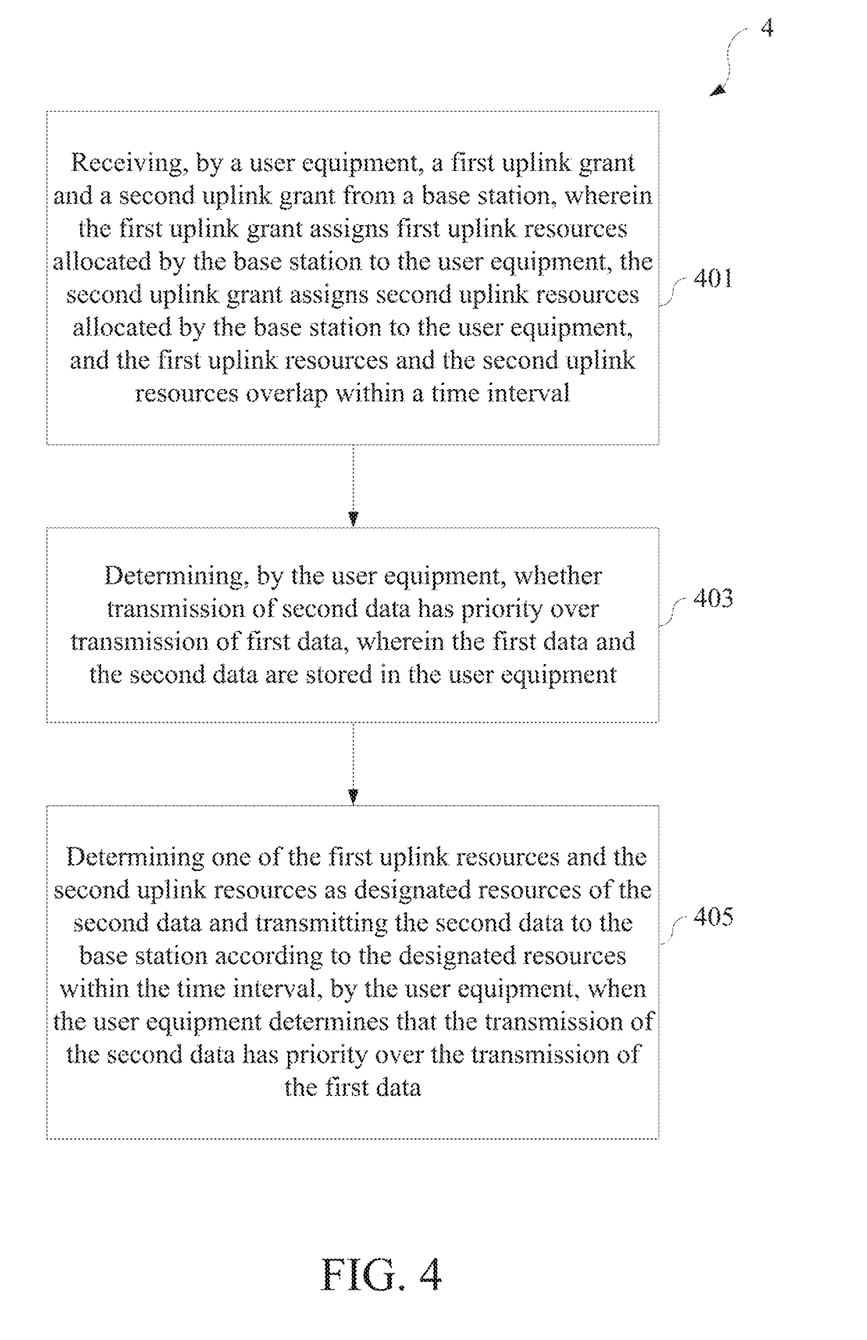
FIG. 4 illustrates an uplink data transmission method according to some embodiments.

FIG. 4 illustrates an uplink data transmission method according to some embodiments. The content of FIG. 4 is shown only for the purpose of illustrating embodiments of the present invention and is not intended to limit the present invention.

Referring to FIG. 4, an uplink data transmission method 4 may comprise the following steps: receiving, by a user equipment, a first uplink grant and a second uplink grant from a base station, wherein the first uplink grant assigns first uplink resources allocated by the base station to the user equipment, the second uplink grant assigns second uplink resources allocated by the base station to the user equipment, and the first uplink resources and the second uplink resources overlap within a time interval (labeled as the step 401); determining, by the user equipment, whether transmission of second data has priority over transmission of first data, wherein the first data and the second data are stored in the user equipment (labeled as the step 403); and determining one of the first uplink resources and the second uplink resources as designated resources of the second data and transmitting the second data to the base station according to the designated resources within the time interval, by the user equipment, when the user equipment determines that the transmission of the second data has priority over the transmission of the first data (labeled as the step 405).

In some embodiments, the first data has not been encapsulated into a first protocol data unit (PDU), and the second data has not been encapsulated into a second PDU. The uplink data transmission method 4 further comprises the following steps: refraining from encapsulating the first data into the first PDU and encapsulating the second data into the second PDU according to the designated resources, by the user equipment. Besides, in the step 405, the user equipment transmits the second PDU to the base station according to the designated resources within the time interval.

In some embodiments, the second data has not been encapsulated into a second PDU, and the first data has been encapsulated into a first PDU. The uplink data transmission method 4 further comprises the following steps: discarding the first PDU and encapsulating the second data into the second PDU according to the designated resources, by the user equipment. Besides, in the step 405, the user equipment transmits the second PDU to the base station according to the designated resources within the time interval.

In some embodiments, the second data has not been encapsulated into a second PDU, the first data has been encapsulated into a first PDU, and the user equipment has transmitted the first PDU. The uplink data transmission method 4 further comprises the following step: encapsulating the second data into the second PDU according to the designated resources, by the user equipment. Besides, in the step 405, the user equipment transmits the second PDU to the base station according to the designated resources within the time interval, and preempts the first PDU.

In some embodiments, the user equipment determines whether the transmission of the second data has priority over the transmission of the first data in a MAC layer.

In some embodiments, the user equipment determines whether the transmission of the second data has priority over the transmission of the first data according to logical channel prioritization in a MAC layer.

In some embodiments, the user equipment determines one of the first uplink resources and the second uplink resources as the designated resources of the second data according to uplink grant attributes in a PHY layer.

In some embodiments, the first uplink grant is a dynamic grant, the second uplink grant is a configured grant, the first data is eMBB data, and the second data is URLLC data.

In some embodiments, the first uplink grant is a dynamic grant, the second uplink grant is a configured grant, the first data is eMBB data, and the second data is URLLC data. In addition, when the user equipment determines that the transmission of the second data has priority over the transmission of the first data, the user equipment determines the second uplink resources as the designated resources of the second data, and when the user equipment determines that the transmission of the first data has priority over the transmission of the second data, the uplink data transmission method 4 further comprises the following steps: determining the first uplink resources as designated resources of the first data and transmitting the first data to the base station according to the designated resources of the first data within the time interval, by the user equipment. It is optional that in these embodiments the uplink data transmission method 4 may further comprises the following step: before transmitting the first data or the second data to the base station within the time interval, transmitting, by the user equipment, a notification of the respective designated resources to the base station.

In some embodiments, the first uplink grant is a dynamic grant, the second uplink grant is a configured grant, the first data is eMBB data, and the second data is URLLC data. In addition, in a case where the processor determines that the transmission of the second data has priority over the transmission of the first data and defaults to selecting the second uplink resources as the designated resources of the second data, the uplink data transmission method 4 further comprises the following steps: determining, by the user equipment, whether a prioritization indication of the second uplink grant is lower than a logical channel prioritization indication of the second data, and when determining that the prioritization indication of the second uplink grant is lower than the logical channel prioritization indication of the second data, the user equipment determines to select the second uplink resources as the designated resources of the second data.

In some embodiments, the first uplink grant is a dynamic grant, the second uplink grant is a configured grant, the first data is eMBB data, and the second data is URLLC data. In addition, in a case where the processor determines that the transmission of the second data has priority over the transmission of the first data and defaults to selecting the second uplink resources as the designated resources of the second data, the uplink data transmission method 4 further comprises the following steps: determining, by the user equipment, whether the second uplink grant permits the transmission of the second data, and when determining that the second uplink grant permits the transmission of the second data, the user equipment determines to select the second uplink resources as the designated resources of the second data.

Each embodiment of the uplink data transmission method 4 substantially corresponds to a certain embodiment of the wireless communication system 1. Therefore, even if some corresponding embodiments of the uplink data transmission method 4 are not described in detail, the PHSITA can still understand the unspecified embodiments of the uplink data transmission method 4 according to the above descriptions to the wireless communication system 1.

This application claims the priority and benefit of U.S. Provisional Patent Application Ser. No. 62/795,030 filed on Jan. 22, 2019 and titled "Intra-UE Prioritization and Multiplexing for Different Services," and all the disclosure of the Provisional patent application is incorporated herein by reference.

The above disclosure is related to the detailed technical contents and inventive features thereof for some embodiments of the present invention, but such disclosure is not to limit the present invention. The PHOSITA may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A user equipment, comprising:
a storage, being configured to store first data and second data;
a transceiver, being configured to receive a first uplink grant and a second uplink grant from a base station, wherein the first uplink grant assigns first uplink resources, the second uplink grant assigns second uplink resources, the second uplink grant corresponds to a predetermined white list, and the first uplink resources and the second uplink resources overlap within a time interval; and
a processor, being connected to the storage and the transceiver, and being configured to determine whether transmission of the second data has priority over transmission of the first data;
wherein when the processor determines that the transmission of the second data has priority over the transmission of the first data, the processor determines one of the first uplink resources and the second uplink resources as designated resources of the second data, and the transceiver transmits the second data to the base station according to the designated resources within the time interval;
wherein in a case where the processor determines that the transmission of the second data has priority over the transmission of the first data and defaults to selecting the second uplink resources as the designated resources of the second data, the processor further determines whether a logical channel of the second data is recorded on the predetermined white list, and when the processor determines that the logical channel of the second data is recorded on the predetermined white list, the processor determines to select the second uplink resources as the designated resources of the second data.

2. The user equipment of claim 1, wherein:
the first data has not been encapsulated into a first protocol data unit (PDU), and the second data has not been encapsulated into a second PDU;
the processor refrains from encapsulating the first data into the first PDU, and encapsulates the second data into the second PDU according to the designated resources; and
the transceiver transmits the second PDU to the base station according to the designated resources within the time interval.

3. The user equipment of claim 1, wherein:
the second data has not been encapsulated into a second PDU, and the first data has been encapsulated into a first PDU;
the processor discards the first PDU, and encapsulates the second data into the second PDU according to the designated resources; and
the transceiver transmits the second PDU to the base station according to the designated resources within the time interval.

4. The user equipment of claim 1, wherein:
the second data has not been encapsulated into a second PDU, the first data has been encapsulated into a first PDU, and the transceiver has transmitted the first PDU;
the processor encapsulates the second data into the second PDU according to the designated resources; and the transceiver transmits the second PDU to the base station according to the designated resources within the time interval, and preempts the first PDU.

5. The user equipment of claim 1, wherein the processor determines whether the transmission of the second data has priority over the transmission of the first data in a Media Access Control layer.

6. The user equipment of claim 5, wherein the processor determines whether the transmission of the second data has priority over the transmission of the first data according to logical channel prioritization.

7. The user equipment of claim 1, wherein the processor determines one of the first uplink resources and the second uplink resources as the designated resources of the second data according to uplink grant attributes in a physical layer.

8. The user equipment of claim 1, wherein the first uplink grant is a dynamic grant, the second uplink grant is a configured grant, the first data is Enhanced Mobile Broadband data, and the second data is Ultra-Reliable and Low Latency Communications data.

9. The user equipment of claim 8, wherein:
when determining that the transmission of the second data has priority over the transmission of the first data, the processor determines the second uplink resources as the designated resources of the second data; and
when determining that the transmission of the first data has priority over the transmission of the second data, the processor determines the first uplink resources as designated resources of the first data, and the transceiver transmits the first data to the base station according to the designated resources of the first data within the time interval.

10. The user equipment of claim 9, wherein before transmitting the first data or the second data to the base station within the time interval, the transceiver further transmits a notification of the respective designated resources to the base station.

11. An uplink data transmission method, comprising:
receiving, by a user equipment, a first uplink grant and a second uplink grant from a base station, wherein the first uplink grant assigns first uplink resources, the second uplink grant assigns second uplink resources, the second uplink grant corresponds to a predetermined white list; and the first uplink resources and the second uplink resources overlap within a time interval;
determining, by the user equipment, whether transmission of second data has priority over transmission of first data, wherein the first data and the second data are stored in the user equipment; and
determining one of the first uplink resources and the second uplink resources as designated resources of the second data and transmitting the second data to the base station according to the designated resources within the time interval, by the user equipment, when the user equipment determines that the transmission of the second data has priority over the transmission of the first data;
wherein in a case where the processor determines that the transmission of the second data has priority over the transmission of the first data and defaults to selecting the second uplink resources as the designated resources of the second data, the uplink data transmission method further comprises: determining, by the user equipment, whether a logical channel of the second data is recorded on the predetermined white list, and when determining that the logical channel of the second data is recorded on the predetermined white list, the user equipment determines to select the second uplink resources as the designated resources of the second data.

12. The uplink data transmission method of claim 11, wherein:
the first data has not been encapsulated into a first protocol data unit (PDU), and the second data has not been encapsulated into a second PDU;
the uplink data transmission method further comprises: refraining from encapsulating the first data into the first PDU and encapsulating the second data into the second PDU according to the designated resources, by the user equipment; and
in the step of transmitting the second data, the user equipment transmits the second PDU to the base station according to the designated resources within the time interval.

13. The uplink data transmission method of claim 11, wherein:
the second data has not been encapsulated into a second PDU, and the first data has been encapsulated into a first PDU;
the uplink data transmission method further comprises: discarding the first PDU and encapsulating the second data into the second PDU according to the designated resources, by the user equipment; and
in the step of transmitting the second data, the user equipment transmits the second PDU to the base station according to the designated resources within the time interval.

14. The uplink data transmission method of claim 11, wherein:
the second data has not been encapsulated into a second PDU, the first data has been encapsulated into a first PDU, and the user equipment has transmitted the first PDU;
the uplink data transmission method further comprises: encapsulating the second data into the second PDU according to the designated resources, by the user equipment; and
in the step of transmitting the second data, the user equipment transmits the second PDU to the base station according to the designated resources within the time interval, and preempts the first PDU.

15. The uplink data transmission method of claim 11, wherein the user equipment determines whether the transmission of the second data has priority over the transmission of the first data in a Media Access Control layer.

16. The uplink data transmission method of claim 15, wherein the user equipment determines whether the transmission of the second data has priority over the transmission of the first data according to logical channel prioritization.

17. The uplink data transmission method of claim 11, wherein the user equipment determines one of the first uplink resources and the second uplink resources as the designated resources of the second data according to uplink grant attributes in a physical layer.

18. The uplink data transmission method of claim 11, wherein the first uplink grant is a dynamic grant, the second uplink grant is a configured grant, the first data is Enhanced Mobile Broadband data, and the second data is Ultra-Reliable and Low Latency Communications data.

19. The uplink data transmission method of claim 18, wherein:
when determining that the transmission of the second data has priority over the transmission of the first data, the user equipment determines the second uplink resources as the designated resources of the second data; and when the user equipment determines that the transmission of the first data has priority over the transmission of the second data, the uplink data transmission method further comprises: determining the first uplink resources as designated resources of the first data and transmitting the first data to the base station according to the designated resources of the first data within the time interval, by the user equipment.

20. The uplink data transmission method of claim 19, further comprising:
before transmitting the first data or the second data to the base station within the time interval, transmitting, by the user equipment, a notification of the respective designated resources to the base station.

* * * * *